April 21, 1925. 1,535,008

G. G. ZANETTI

DEMOUNTABLE AUTOMOBILE TOP

Filed April 4, 1921 10 Sheets-Sheet 1

Inventor:
Giuseppe Gaetano Zanetti
By
Attorney.

April 21, 1925.
G. G. ZANETTI
1,535,008
DEMOUNTABLE AUTOMOBILE TOP
Filed April 4, 1921 10 Sheets-Sheet 2
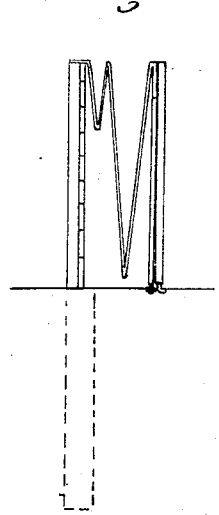
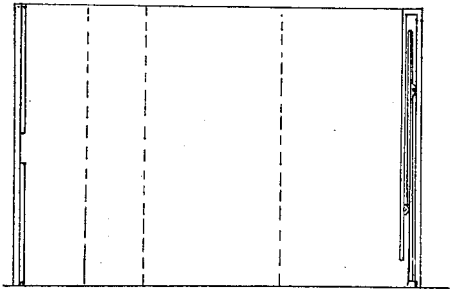
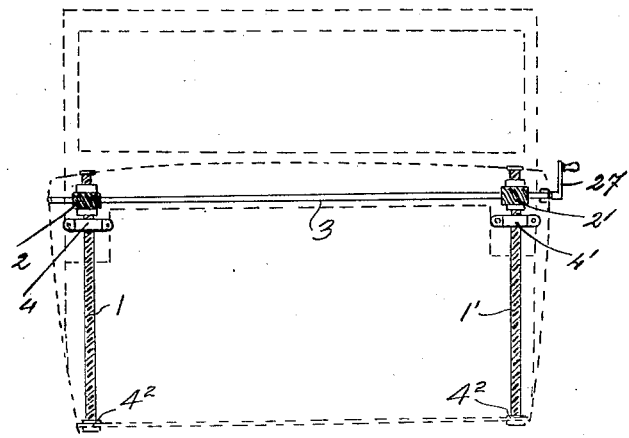
Inventor:
Giuseppe Gaetano Zanetti
By
Attorney

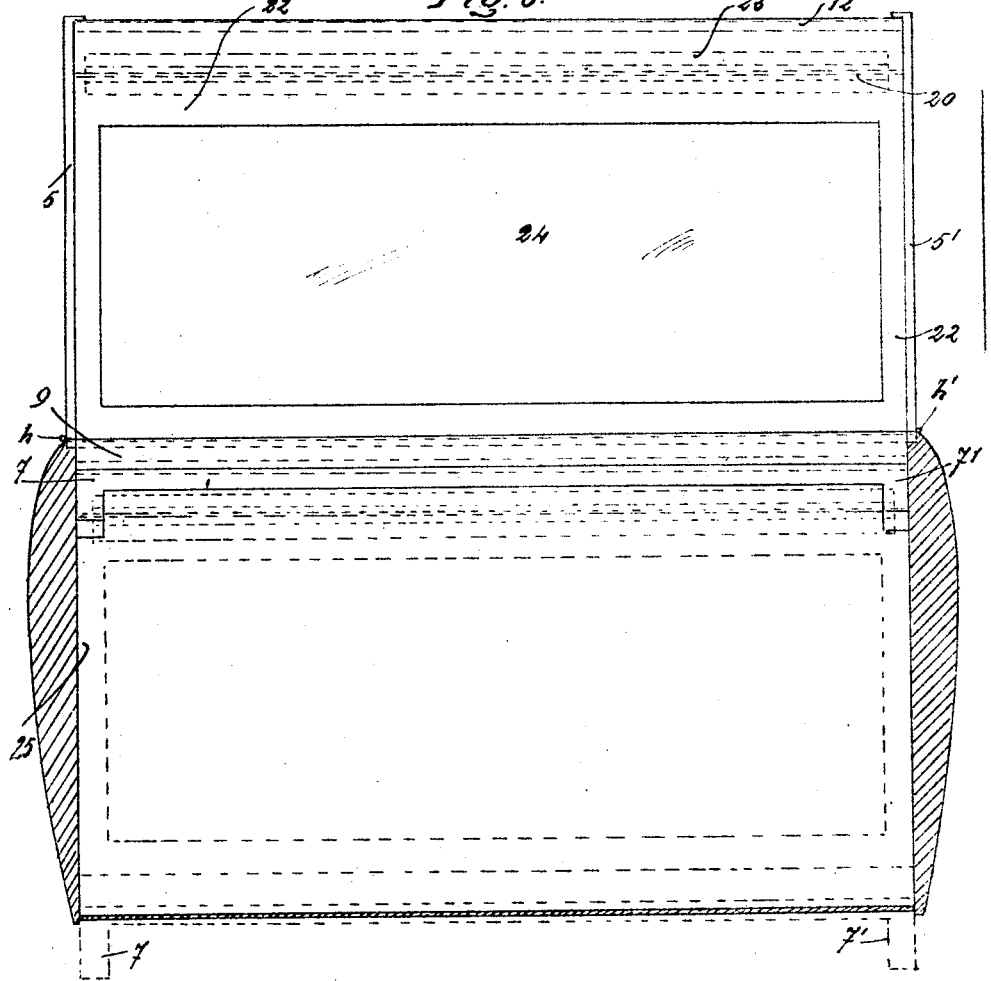
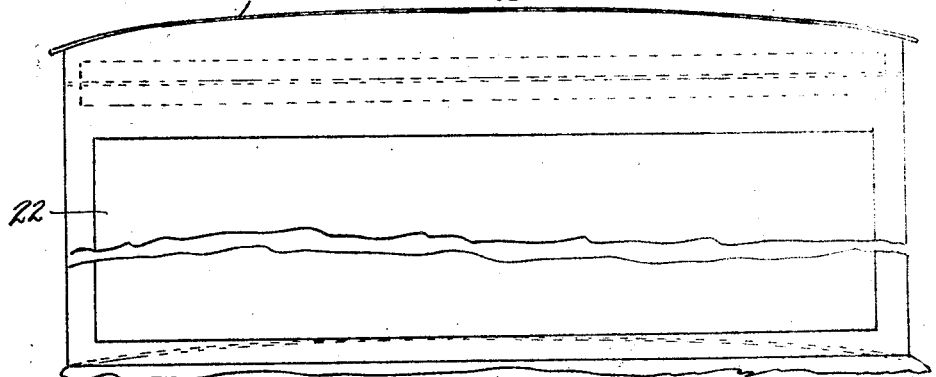

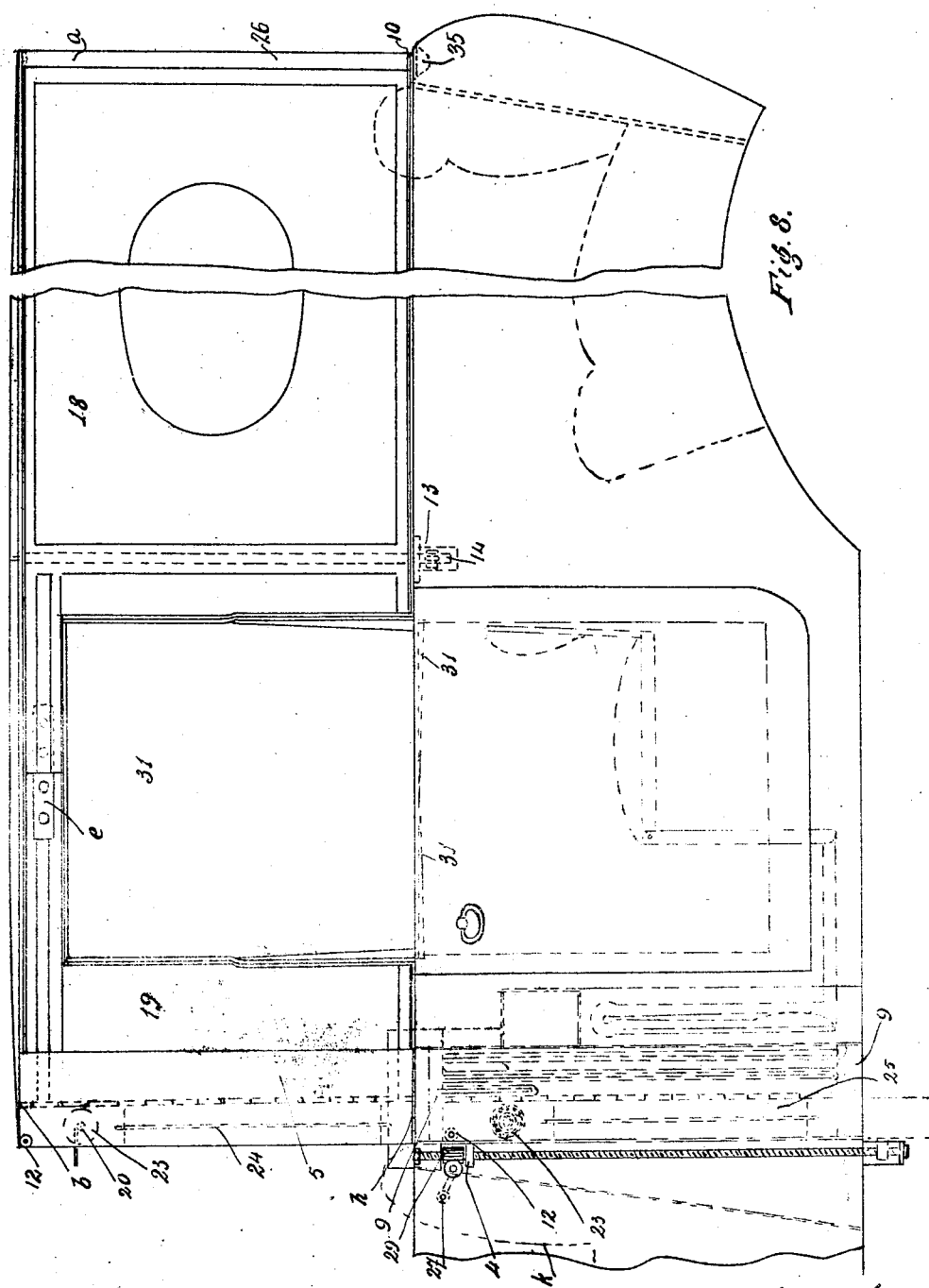

April 21, 1925.  1,535,008
G. G. ZANETTI
DEMOUNTABLE AUTOMOBILE TOP
Filed April 4, 1921  10 Sheets-Sheet 5
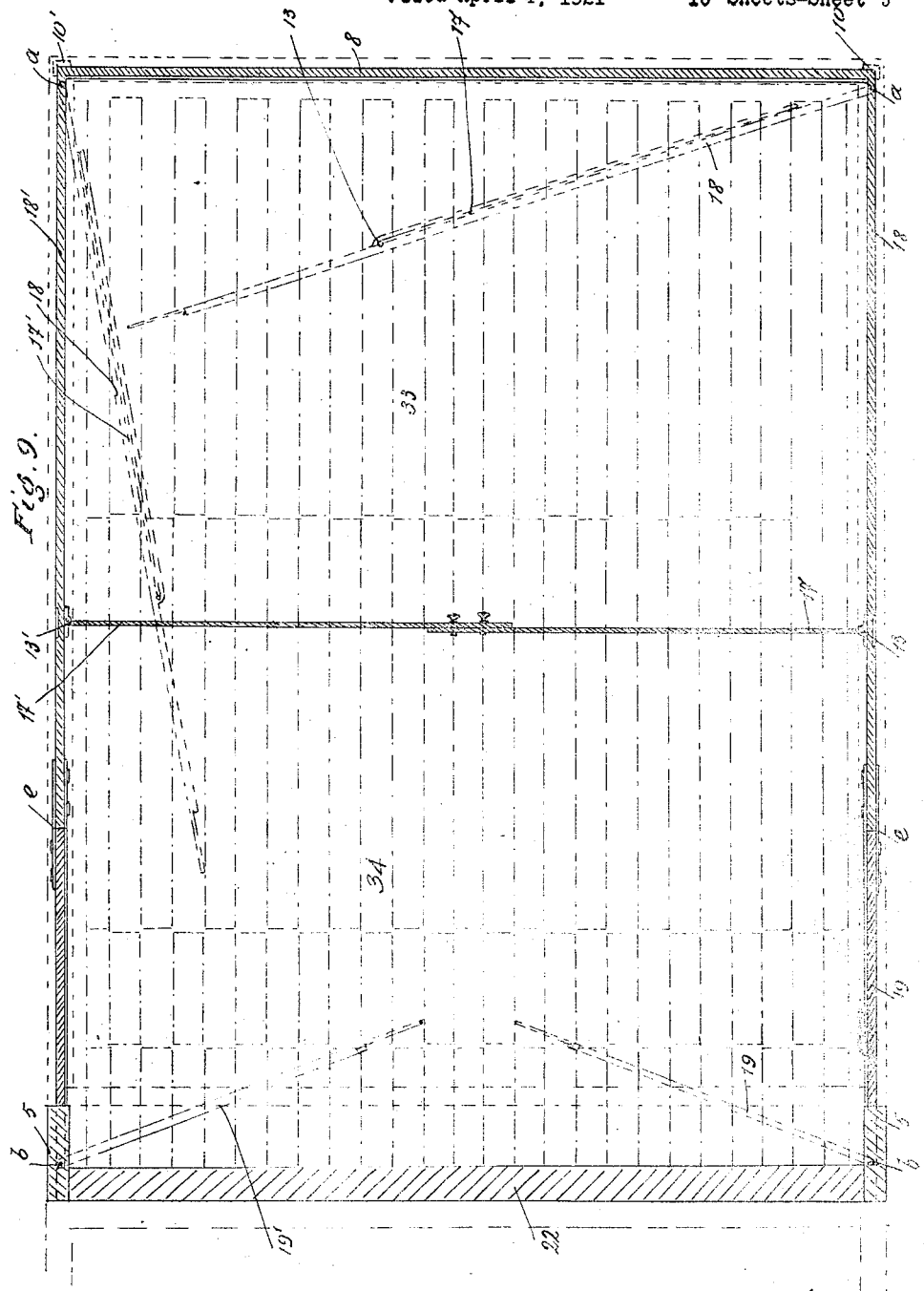
Inventor:
Giuseppe Gaetano Zanetti
By
Attorney.

April 21, 1925.　　　　　　　　　　　　　　　　1,535,008
G. G. ZANETTI
DEMOUNTABLE AUTOMOBILE TOP
Filed April 4, 1921　　　10 Sheets-Sheet 6
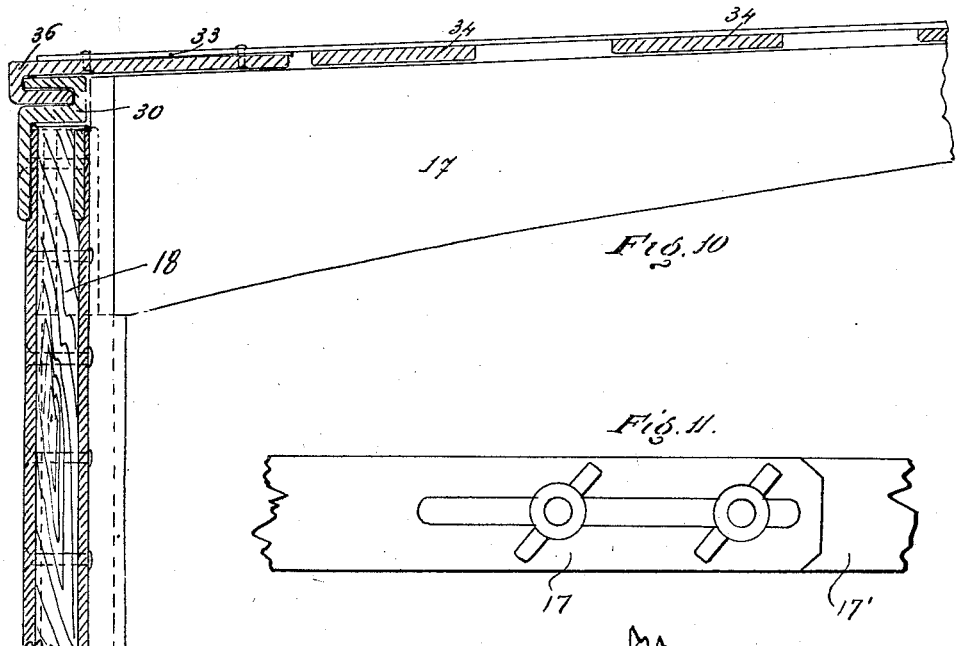
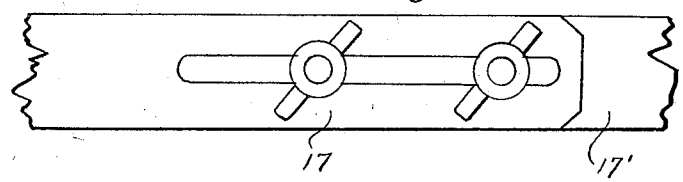
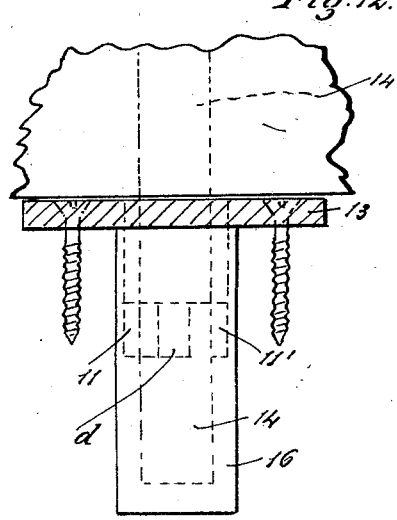
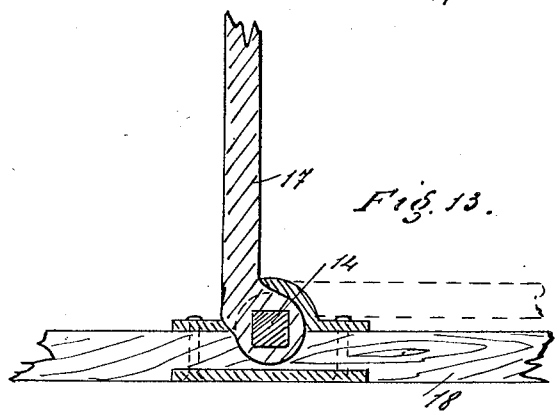
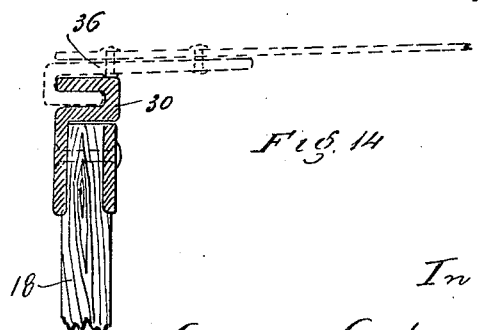
Inventor:
Giuseppe Gaetano Zanetti
By
Attorney

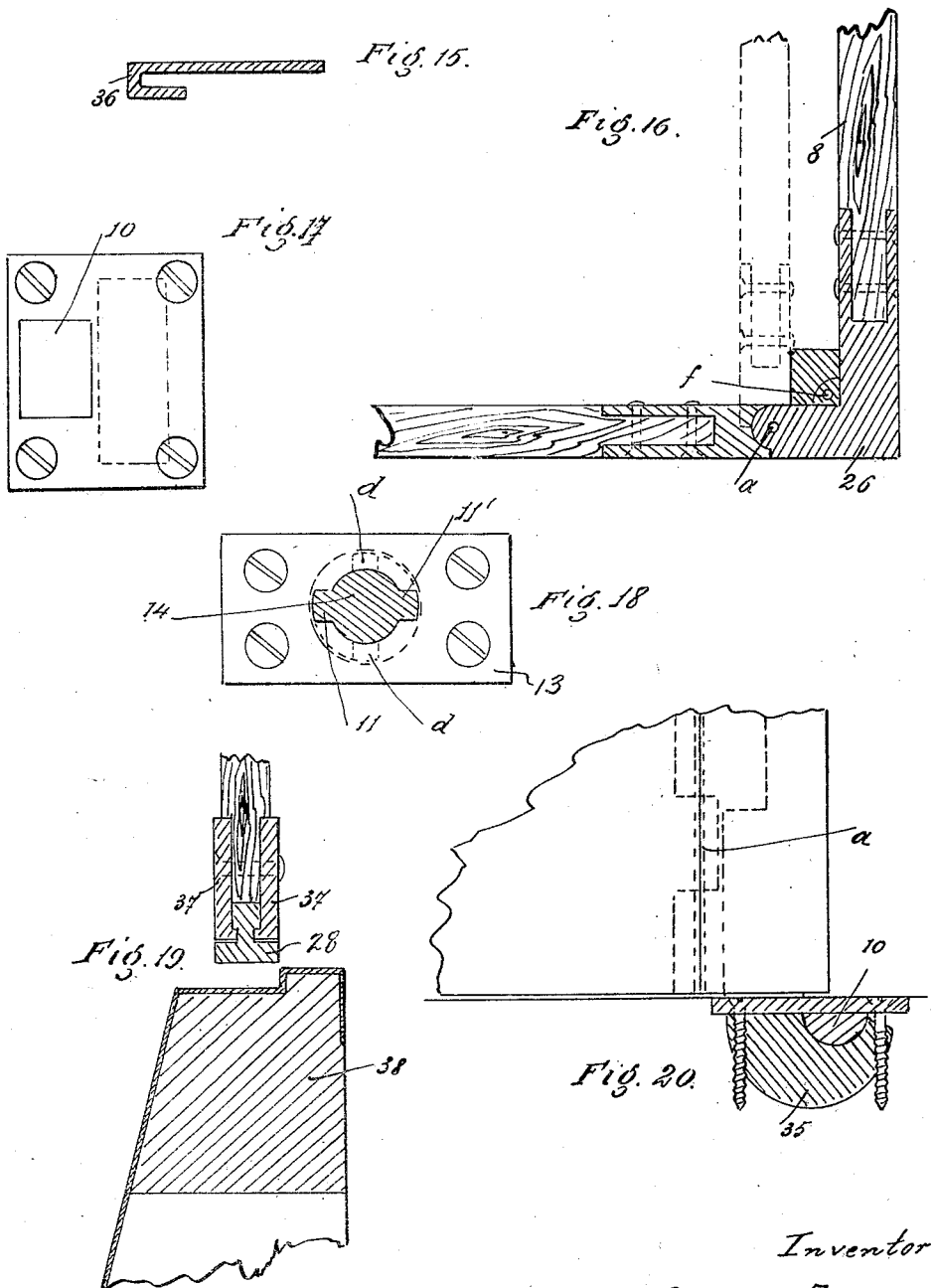

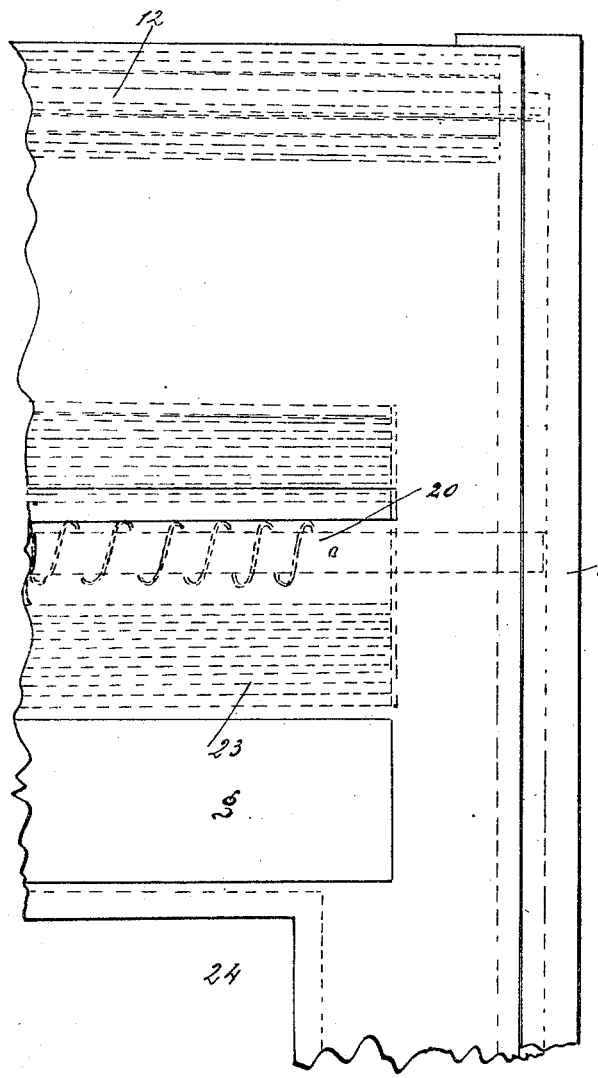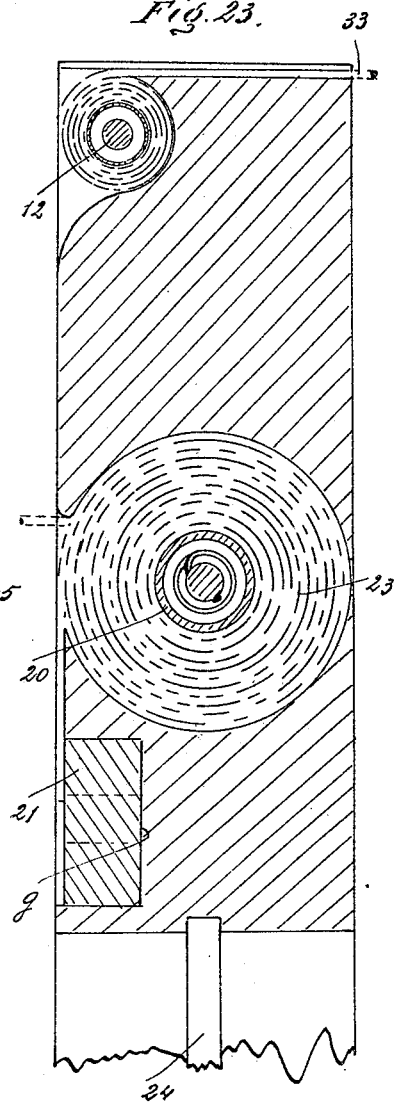

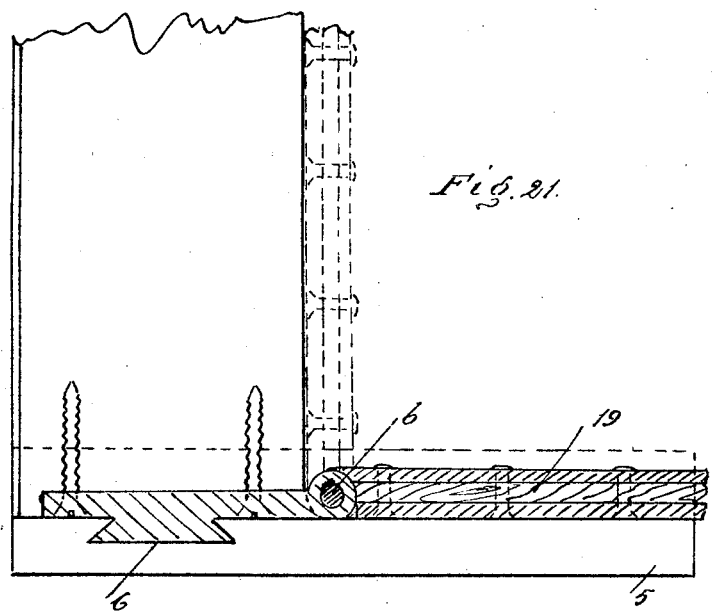
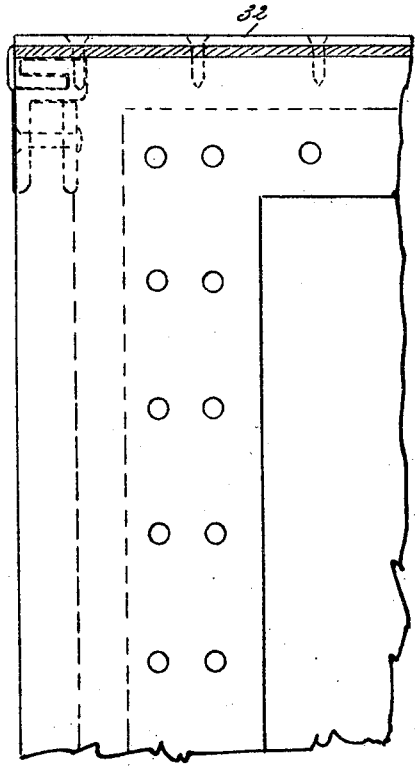

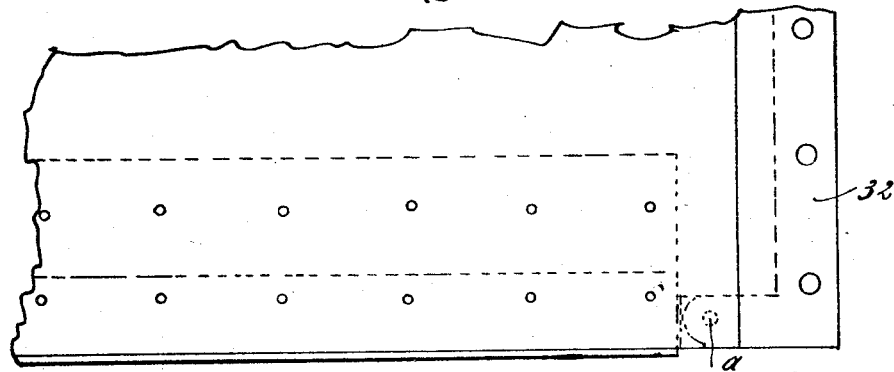
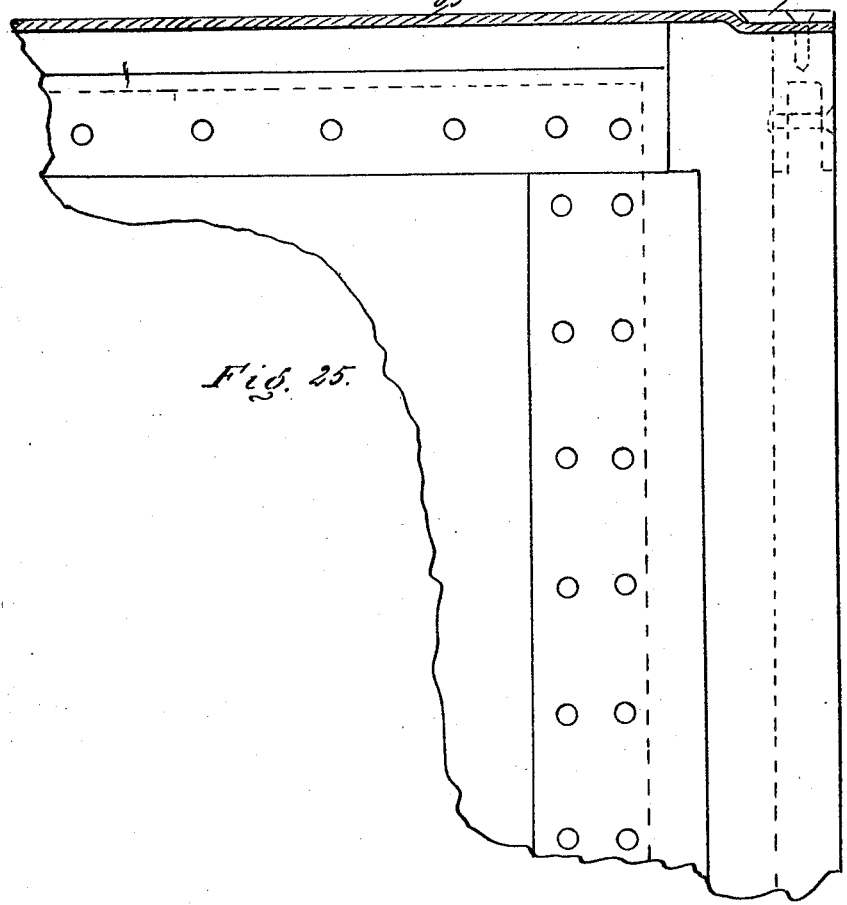

Patented Apr. 21, 1925.

1,535,008

UNITED STATES PATENT OFFICE.

GIUSEPPE GAETANO ZANETTI, OF MILAN, ITALY.

DEMOUNTABLE AUTOMOBILE TOP.

Application filed April 4, 1921. Serial No. 458,275.

*To all whom it may concern:*

Be it known that I, GIUSEPPE GAETANO ZANETTI, residing at Milan, in the Kingdom of Italy, have invented new and useful Improvements in Demountable Automobile Tops, of which the following is a specification.

This invention provides an improved structure which may be used either as a complete transformable motor car body with collapsible top, or merely as a top alone for attachment to ordinary open cars which are changed or modified to receive the said top.

The top is lodged, when not in use, in the approximate center or central bridge of the torpedo body adjacent the rear windshield; in which position it remains fully sheltered from the weather and protected against shocks when the car is running, due to its disposition between the front and rear axles.

In the following description, and in the annexed drawings, the top is shown, by way of example, as forming part of, or as applied to, a closed car of the limousine type; but the invention may be readily applied to the sedan type of car by adding the extra sides and roof, as well as to the "sport" or non-rigid type in which the side walls are constructed of canvas or other suitable light or flexible material.

In the accompanying drawings:

Fig. 3 shows how the roof of the top folds up against the main wall.

Fig. 4 shows how the side walls of the top fold up against the main wall.

Fig. 5 illustrates the mechanical devices for raising and lowering the main wall and attached parts.

Fig. 6 is an enlarged cross-section on line 6—6, Fig. 1, showing in full lines the main wall in its raised position, and in dotted lines the said wall lowered into its pocket.

Figs. 7 and 8 are front and side views of the top, and Fig. 9 a horizontal section.

Fig. 10 is a cross-section of the side walls and roof, with the frames for obtaining the desired rigidity of the top.

Fig. 11 is a view of the joint between the two halves of the reinforcing arch.

Fig. 12 is a detail section showing the connection between the rear side walls and the central locking bars.

Fig. 13 is a sectional view illustrating the pivotal mounting of the members of the arch.

Fig. 14 shows the connection between the side walls and the roof.

Fig. 15 is a detail sectional view of one of the connecting hooks.

Fig. 16 is a fragmental horizontal section of the side and rear walls.

Fig. 17 is a plan view of one of the fastening plates for the rear wall.

Fig. 18 is a plan view of the fastening plate represented in Fig. 12.

Fig. 19 is a detail vertical section showing the connection between the car body and the side walls of the top.

Fig. 20. shows in side elevation, with parts in section, the connection between the side wall member and the fastening device of Fig. 17.

Fig. 21 is a horizontal section of a portion of one of the forward members of the side walls.

Fig. 22 is a fragmental front elevation, and Fig. 23 a vertical section, of the front or main wall.

Fig. 24 is a plan view of a portion of the roof, and Figs. 25 and 26 are vertical sections thereof taken at right angles to each other.

Figure 1:
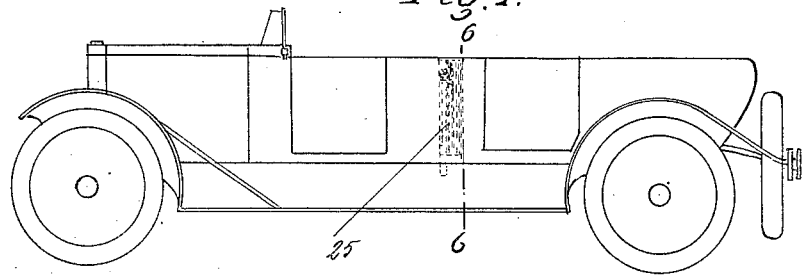
Figure 1 is a side view of an automobile having the top folded up and lowered into the central recess or pocket in the body.
Figure 2:
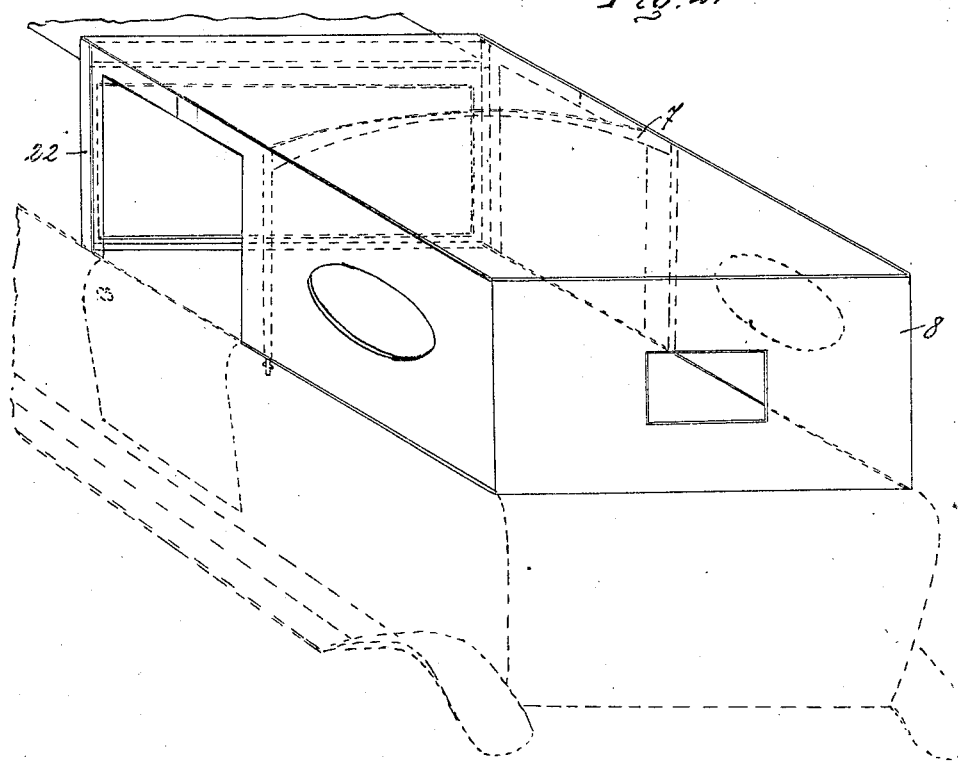
Fig. 2 is a perspective view of the top for a limousine car.

The demountable top of the present invention comprises a main wall 22 (Figs. 2, 6 and 9), in the form of a strong frame of wood or other material, carrying on its upper part the rollers 12 and 20 (Figs. 6, 8, 22 and 23) and provided at its center with a large glass plate 24; the bottom member of the wall having a step 9 formed on or secured to it. This wall is mounted to slide in lateral guides or the like, so as to permit it to be lowered and raised into and out of the pocket 25, said pocket being located in the central bridge, as stated above. The roof and sides of the top are collapsed and folded together as closely as possible against said wall when the top is not in use, and the rear wall 8 is supported upon the step 9.

The guides for the wall 22 are fixed to the upright sides of the torpedo body of the car, which sides also form the sides of the pocket 25. These sides carry long, heavy hinges $h$, $h'$ (Fig. 6) at their upper ends, to which two covers 5, 5' are secured; the covers folding inwardly or toward each other so as to form a closure for the pocket when the top is in place therein. When the top is withdrawn from its pocket, the covers are raised; each cover being preferably formed of metal and provided on its inner face with a dove-tail groove 6 (Fig. 21) in correspondence with, and in continuation of, the guide formed in the adjacent side of the pocket, so that the wall 22 is thus enabled to slide in the grooves up to the ends of the covers—that is to say, to the position which it occupies when the top is in use. The covers, being pivoted on heavy hinges as previously stated, act as supports for, and maintain the rigidity of, the main wall, in which action they are assisted by the depending extensions or feet 7, 7' provided on the lower corners of said wall which remain constantly engaged with the guides in the pocket 25 and thus serve to additionally steady the wall to some extent.

The raising and lowering of the main wall 22 (and with it the top) out of and into the pocket 25 may be effected by means of two small screw winches 29, fitted between the backs of the front seats $k$ and the pocket 25, as shown in Fig. 8. These winches operate simultaneously, and are actuated by a horizontal shaft 3 provided with a crank handle 27; said shaft having fixed to it a pair of worms, 2, 2' which mesh with worm wheels mounted on the upper ends of a pair of screws 1, 1', so that both screws thus turn in unison and in the same direction. The screws themselves are suitably mounted in brackets 4, 4' (Fig. 5) and carry nuts 4² which are adapted to travel up or down according to the direction in which the screws are rotated and which are secured to the lower end of wall 22; the latter being thereby raised or lowered evenly and gradually, as will be understood.

The rear side walls 18, 18' of the top may be formed of leather, cloth, etc. stretched over suitable frames; or, as in the construction illustrated, they may be made of wood laminae, with metal frames suitably fixed to the wood; but they may also be made of aluminum, in which case the frames will be omitted. The metal frames impart the desired rigidity to the side walls, and they also serve to connect said walls to the side members of the frame of the roof 33; for which purpose said members are constructed in the form of hooks in cross-section, as indicated at 36 in Figs. 10, 14 and 15, to interlock with the similarly-shaped top members 30 of the side frames and thereby provide tight joints and consequent protection against inclement weather. The bottom members 37 of the side frames carry rubber cushions or feet 28 (Fig. 19), so that the side walls are thus enabled to rest squarely upon the upper edges of the side walls 38 of the body. Finally, the vertical side members of the frames are constructed to form hinges as represented in Figs. 13, 16, 20 and 21, to permit the side walls to be folded at $a$ and $b$ against the rear wall 8 and the main wall 22. The two front half-walls 19 and 19' are also adapted to be folded inwardly against the main wall 22 (see the dotted lines in Fig. 9); but these walls may be omitted and the glasses of the windows extended against the covers 5 and 5'.

The top is brought into use in the following manner: After the front or main wall 22 has been raised out of the pocket 25, carrying with it the various other parts, the rear wall 8 of the top is removed from the step or support 9 on wall 22 and brought back by hand, still with the walls folded, to a position above the rear wall of the body, which latter is provided at its upper corners with slotted keepers 10, 10' (Figs. 9, 17 and 20). Wall 8, like the side walls of the top, comprises a metal frame, as will be understood from Fig. 16; and this frame has its side members 26 provided with hooks 35 to engage the keepers 10, 10', whereby the wall 8 may be securely locked to the body, said wall being held in a rearwardly inclined position while the insertion of the hooks into the keepers is being effected. The two rear members 18 and 18' of the side walls are then swung out and locked to the sides of the body by means of keeper plates 13, 13' (Figs. 12 and 18) provided with depending sockets 16 which open upwardly through said plates and are designed to receive the lower ends of vertical bars 14 which are rotatably or hingedly attached to the inner faces of the said members 18, 18' and are formed integral with arched brace members 17, 17' hereinafter referred to. The aforesaid lower ends of the bars 14 are formed with diametrically-opposite lugs 11, 11' (Fig. 12), and the lower ends of the sockets 16 are formed with extensions $d$ to receive said lugs, so that when said bars are turned through an angular distance of 90°, their lugs or ears will be caused to enter said extensions and thereby lock the parts securely together. Before this locking action is effected, however, the coacting hooks 30 and 36 on the frames of the side walls and roof are interengaged to connect said parts with each other, and then the arched brace members are swung inwardly so as to overlap at their free ends, as indicated in Fig. 11, after which their overlapping ends may be suitably joined; and it is this inward swinging movement of the aforesaid brace members which produces the rotary locking movement of the bars 14.

The front members 19 and 19' of the side walls are next opened out and hooked at their top edges to the side members of the roof frame in the same way as the rear members 18, 18'; and the two sets of members 18, 18' and 19, 19' are fastened together at their meeting edges at *e* (Fig. 9) by screws or in some other suitable manner. The roof 33, which is made of leather, waxed cloth, rubber or other flexible material, and which is attached at its front end to the spring roller 12 carried by wall 22 (see Figs. 22 and 23), is then pulled backward and fastened to the top of the rear wall 8 by means of screws and a metal strip 32 (Figs. 24, 25, 26) or in any other desired way; said roof being held stretched in the direction of its length by the roller 12 and in a transverse direction by its passage across the arch 17—17'. Rigid or semi-rigid ribs 34 may be provided on the under side of the roof, as well as the hook-shaped marginal frame 36 previously referred to, which frame is maintained in a somewhat tensioned state consequent upon its connection to the hooks 30 of the side wall frames. The passage of the roof over the arch 17—17' has the further effect of bowing it slightly, so that it will shed water; and to render the car still more weatherproof, the edges of the sides 38 of the body may be flared outward, as represented in Fig. 19. Finally, the glass panels 31 of the doors (Fig. 8) are raised into position, thereby completing the closing-in of the car.

The rear side wall members 18, 18' and the rear wall 8 may be provided with windows of glass or celluloid of suitable size and shape; and said wall members, as well as the forward side members 19, 19' may be lacquered or varnished in the same color as the body, or may be covered externally with leather, etc. The interior of the top may be lined with material which can be fastened along the corners of the top by means of rods inserted at *f* (Fig. 16); and the front wall may be provided with a front curtain 23 (Figs. 22 and 23), which is normally wound up on the spring roller 20 but which can be unrolled at will and fastened to the side members of the front windshield by means of a bar 21, the latter adapted to be positioned in a groove *g* in the front face of wall 22 when not in use.

To transform the limousine car into an open car, the operation is the reverse of that above described. When the front wall 22 and the folded parts have been lowered into the pocket 25, the covers 5, 5' are swung down over the top of the pocket so as to close the same; but instead of utilizing these covers, the pocket may be closed by means of an enlargement or head 39 (Fig. 7) formed integral with the wall 22.

The advantages of the invention are obvious, and consists, chiefly, in the complete invisibility of the top when not in use; the possibility of giving the body more graceful lines than could heretofore be done, owing to the absence of the usual folding top; the facility and rapidity with which the open car can be converted into a completely closed car affording the occupants perfect protection against the weather; and the provision of such a storage place for the top that the latter, when disposed therein, will be subjected to a minimum of shocks and, on the other hand, will not be exposed to the action of dust and of the atmosphere.

Having described my invention, I claim:—

1. In combination with the body of an automobile, a built-in, collapsible, disappearing, closed car top having front and rear transverse portions, and side and roof portions; means interconnecting said portions and permitting all of said portions to be collapsed and folded together to form a single compact unit; a pocket in the central part of the automobile body; and means for mechanically depositing said unit in said pocket.

2. In combination with the body of an automobile, a built-in, demountable top having front and rear transverse portions, and side and roof portions; means interconnecting to one of the transverse portions all of the other said portions and permitting said other portions to be folded together against the transverse portion to which they are interconnected to form a single compact unit therewith; a pocket in the central part of said automobile body; and means for mechanically depositing said unit in said pocket.

3. A collapsible closed car top for automobiles and the like, comprising a front transverse wall; a rear transverse wall; side walls each comprising a forward part and a rear part; means for mounting the forward parts of the side walls upon the front transverse wall and permitting them to swing toward and move into close contact with said front wall; means for mounting the rearward parts of the side walls upon the rear transverse wall and permitting them to swing toward and into close contact with said rear wall; and a foldable roof connected to the front wall and rear wall; a pocket in the central part of the automobile body; and means for permitting said walls and roof to be collapsed and folded together to form a single compact unit to be mechanically deposited in said pocket.

4. In combination with the body of an automobile, a collapsible disappearing closed top comprising front and rear transverse portions, and side and roof portions; means interconnecting to the front transverse portion all of the other said portions and permitting said other portions to be collapsed and folded together against said front transverse portion to form a single compact unit; and a pocket in the central part of the automobile body in which said unit is mounted to be alternatively concealed wholly therein or withdrawn wholly therefrom; said forward transverse portion constituting a supporting frame for all of the other said portions and having a sliding connection at its lower end with the sides of the pocket.

In testimony whereof I affix my signature.

GIUSEPPE GAETANO ZANETTI.